Sept. 30, 1958      J. J. KOTTE      2,853,922
ADJUSTABLE LENS MOUNT
Filed Jan. 10, 1956
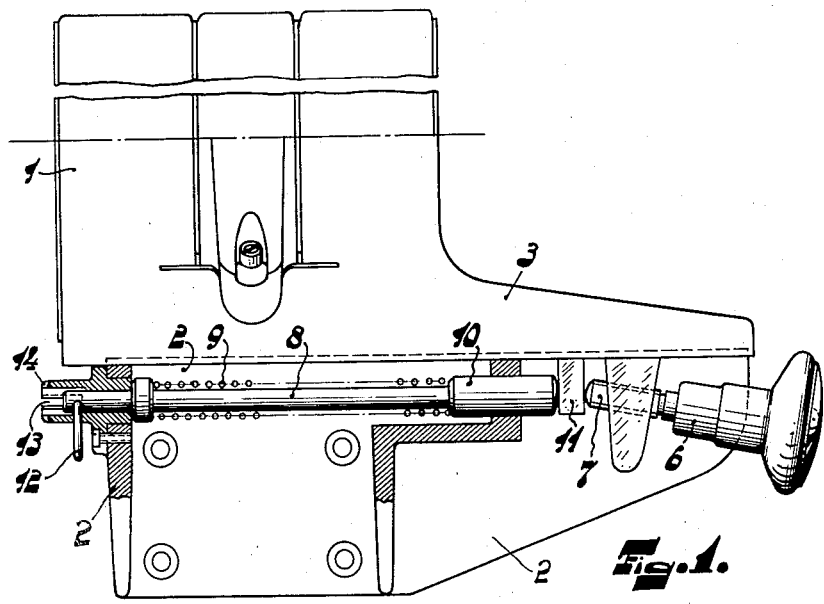
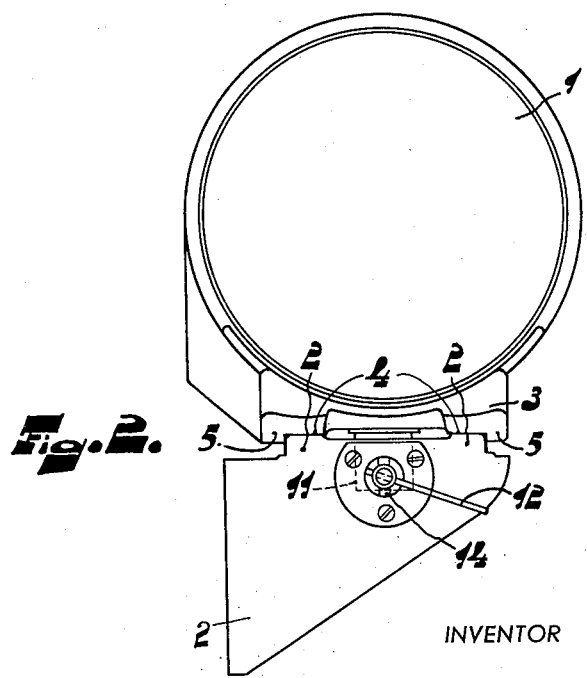
INVENTOR
JAN JACOB KOTTE
BY
AGENT

United States Patent Office 2,853,922
Patented Sept. 30, 1958

2,853,922
ADJUSTABLE LENS MOUNT

Jan Jacob Kotte, Eindhoven, Netherlands, assignor, by mesne assignments, to North American Philips Company, Inc., New York, N. Y., a corporation of Delaware Application January 10, 1956, Serial No. 558,301

Claims priority, application Netherlands October 1, 1955

3 Claims. (Cl. 88—24)

The invention relates to cinematograph film projectors in which the lens objective holder is movable by means of an adjusting device to achieve sharp adjustment of the lens objective.

In a known design of the said film projectors, the adjusting device consists of a pin which is pivotally mounted in the frame of the projector and one screwed end of which engages with a stud of the objective holder in the form of a nut. The objective holder is mounted so that it can be removed only in the direction of the movement for adjustment. However, the screwed pin must first be unscrewed from the associated nut and be removed from the projector before the objective holder can be removed as a whole from the projector. Consequently, this known construction is not suitable for rapid exchange of an objective holder. It may be required to exchange an objective holder rapidly, for example, when the projector is suited to the projection of films of different widths. In the said known projectors it is possible to remove the sleeve in which the objective is clamped from the objective holder. Although thus the position of the objective holder is not changed, when mounting another objective, however, the position in which the sleeve must be locked in the objective holder must be re-determined each time.

It is an object of the invention to obviate the above difficulties.

According to the invention, the adjusting device is secured to the projector only, the objective holder being readily exchangeable so that the position of the adjusting device can be maintained.

The fact that the objective holder is readily exchangeable as a whole enables the position of the objective in the objective holder to be pre-determined in the various holders, so that the exchange of an objective holder takes very little time. Easy exchangeability can be ensured, for example, by securing the objective holder to a part of the adjusting device which is supported from and accurately movable over the frame of the projector and, in adjustment, is moved relatively to the frame. Thus, there is no need for the position of the adjusting device to be changed in order to enable the objective holder to be removed from the projector, while, in addition, the position of the objective itself relative to the objective holder can be maintained during exchange.

The above-described attachment of the objective holder to the adjusting device requires very accurate working of the parts to be secured to one another, since the optical axis of a new objective must in each case coincide exactly with the optical axis of the remainder of the projector. This requirement frequently gives rise to difficulty in practice.

According to a further feature of the invention, the objective holder is slidable over a bed of the projector and removable from this bed, a stud of the objective holder acting as a stop for the adjusting device. Since the objective holder is mounted on a bed of the projector, it can be removed in any position without this position having to be changed. Due to the fact that a stud of an objective holder acts as a stop for the adjusting device, this stud does not prevent the objective holder from being removed from the projector without further expedients.

The invention will now be described in detail with reference to one embodiment thereof, given by way of example.

Fig. 1 is a part side view, part cross-sectional view of the objective holder provided with an adjusting device in accordance with the invention, Fig. 2 is a plan view in the direction of the optical axis of Fig. 1.

An objective holder 1 is mounted slidably on a bed 2 by means of a base 3 which is slidable over matching surfaces 4 of the bed 2. The base 3 is provided with edges 5 by which the objective holder 1 is guided on the bed 2. An adjusting device comprises a knob 6 secured to the bed 2 and provided with a bolt 7 and a pin 8, which pin is movable in the direction of its length and is surrounded by a helical spring 9 which is enclosed between the projector frame and a thickened end 10 of the pin. Thus, the spring 9 always tends to move the pin 8 towards the knob 6. Between the bolt 7 and the thickened end 10 of the pin 8 provision is made of a stud 11 of the objective holder. This ensures that the adjusting knob 6 and the objective holder 1 co-operate without backlash while, in addition, play between the screwthread on the bolt 7 and the screwthread of the frame of the projector co-operating with it does not produce any change in the position of the objective holder in a given position of the knob 6. The pin 8 is provided with a cross piece 12, which is slidable in a slot 13. By means of the cross piece 12 the pin 8 can be moved against the spring action until the cross piece 12 is situated outside the slot 13. By rotating the cross piece 12 about the pin axis, the latter is locked in a shallow groove 14 and in this position the stud 11 becomes disengaged from the bolt 7 and the end 10 so that the objective holder 1 can be removed from the bed 2 as a whole without further expedients. The position of the knob 6 can be maintained unchanged. If desired, the knob 6 may be provided with a graduated scale, so that, after removal of the objective holder and before mounting another, the knob can be set to a changed position with a resulting accurate sharp adjustment of the new objective. The positions of the knob 6 which correspond to the various objective holders can be predetermined by the operator so that the time required for exchanging the objective holder can be reduced to a minimum. The construction described provides a very simple and constructionally satisfactory exchangeable objective holder in which the adjusting device need not be changed or removed in order to exchange the holder.

What is claimed is:

1. A replaceable and adjustable objective lens holding mount comprising a supporting bed fixedly attached to the frame of a film picture projector, a base member slidably mounted on said supporting bed, a replaceable objective lens holder on said base member slidable on said supporting bed, a projection extending from said base member, an adjusting screw mounted on said supporting bed and engaging a part of said projection, a pin member mounted in said supporting bed, resilient means urging said pin member into engagement with another part of said projection to thereby removably clamp said projection between said adjusting screw and pin member.

2. A lens mount as claimed in claim 1 wherein said pin member is a rod, one end of said rod being urged by a helical spring into engagement with said projection.

3. A lens mount as claimed in claim 2 further comprising a slot in said supporting bed, a cross piece mounted adjacent one end of said rod, said rod and cross piece being slidable in one direction in said slot to disengage said end of the rod from engagement with said projection, and said cross piece when completely withdrawn from said slot being rotatable about its axis to a locking position whereby said cross piece engages an exterior surface of said supporting bed.

References Cited in the file of this patent

UNITED STATES PATENTS

| | | |
|---|---|---|
| 929,776 | Mills | Aug. 3, 1909 |
| 1,187,136 | Gall | June 13, 1916 |
| 1,847,856 | Adams | Mar. 1, 1932 |
| 1,883,943 | Kindelmann et al. | Oct. 25, 1932 |
| 1,884,731 | Kindelmann | Oct. 25, 1932 |
| 1,907,753 | Dina | May 9, 1933 |
| 2,173,237 | Runge | Sept. 19, 1939 |
| 2,491,093 | Dibble et al. | Dec. 13, 1949 |